Sept. 5, 1961     K. SCHLICK     2,999,198

ELECTRICAL CONTROL APPARATUS

Filed July 17, 1958

WITNESSES
Edwin E. Bassler
Clement L. McHale

INVENTOR
Karl Schlick
BY
F. E. Browder
ATTORNEY

United States Patent Office 2,999,198
Patented Sept. 5, 1961

2,999,198
ELECTRICAL CONTROL APPARATUS
Karl Schlick, Karlsruhe, Germany, assignor to Siemens-Halske Aktiengesellschaft, Munich, Germany, a corporation of Germany
Filed July 17, 1958, Ser. No. 749,282
Claims priority, application Germany Aug. 2, 1957
6 Claims. (Cl. 318—207)

This invention relates to electrical control apparatus and more particularly to control apparatus employing transformers or reactors.

In the past, contactors or motors have been controlled by means of electrical control apparatus, including controlled reactors or magnetic amplifiers. The operation of such electrical control apparatus is based upon the saturation characteristics of reactors having magnetic circuits or cores, the control of said reactors being accomplished by the application of control signals or voltages. Contactors or motors have also been controlled in the past by means of semiconductor devices, such as transistors. Transistor control circuits of this type, however, cannot be operated with the usual alternating current line voltages but usually require direct current or unidirectional current voltages. In addition, alternating current voltages employed with transistors must usually be reduced by means of intermediate transformers and at least two transistors must be connected in push-pull relationship.

It is an object of this invention to provide a new and improved electrical control apparatus.

Another object of this invention is to provide a new and improved electrical control apparatus for controlling the flow of electrical power from a source of alternating current to a load by the use of a transformer or reactor and a semiconductor device, such as a transistor.

Other objects of the invention will in part be obvious and will in part appear hereinafter.

By the use of electrical control apparatus embodying the teachings of this invention, it is possible to control contactors or motors, which are connected to an alternating current line voltage by means of a single reactor and only one transistor. This invention utilizes the demagnetizing effect of the secondary winding of a reactor on the primary winding of a reactor. In accordance with the teachings of this invention, one winding (the primary winding) of the reactor is connected in series with the device or load to be controlled, the series circuit being connected across the alternating current supply voltage. The other winding (the secondary winding) of the reactor is shunted by a controllable resistance, such as an electronic tube circuit, but it is more desirable in accordance with the teachings of this invention to connect a transistor to the secondary winding of a reactor through a rectifying circuit or device. The transistor is preferably connected in a common emitter connection so that a direct current or unidirectional current control voltage or signal applied between the emitter and the base of the transistor controls the operation of the transistor. The emitter and the collector of the transistor are connected to the output terminals of a full-wave rectifier whose input terminals are connected to the secondary winding of the reactor.

For a fuller understanding of the nature and objects of the invention, reference should be had to the following detailed description taken in connection with the accompanying drawing in which.

Figure 1:
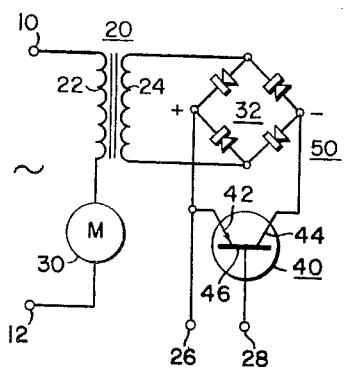
FIGURE 1 is a schematic diagram of circuits and apparatus illustrating one embodiment of this invention.

Referring now to the drawing and FIG. 1 in particular, there is illustrated an electrical control apparatus for controlling the energization of a load, which in this case is illustrated as an electric motor 30 which may be of any conventional single phase, alternating current type. In particular, the motor 30 is supplied electric power from a source of alternating current (not shown) connected at the supply terminals 10 and 12. One side of the motor 30 is connected directly to the supply terminal 12. The other side of the motor 30 is connected to the supply terminal 10 through the first or primary winding 22 of the reactor or transformer 20. The reactor 20 also includes a second or secondary winding 24.

In order to control the flow of electric current from the source (not shown) through the primary winding 22 of the reactor 20 to the motor 30, a variable impedance or resistance means 50 is connected across the secondary winding 24 of the reactor 20. The variable resistance means 50 includes a full-wave rectifier 32 and a transistor 40 having a base 46, an emitter 42 and a collector 44. The input terminals of the rectifier 32 are connected across the secondary winding 24 of the reactor 20. The output terminals of the rectifier 32 are connected to the emitter 42 and the collector 44 of the transistor 40. In order to control the resistance in the emitter-collector path of the transistor 40, the emitter 42 and the base 46 of the transistor 40 are connected to the control terminals 26 and 28. The rectifier 32 insures that only a unidirectional current voltage is applied between the emitter 42 and the collector 44 of the transistor 40. In order to control the conduction in the emitter-collector path of the transistor 40, the control signal or voltage applied to control terminals 26 or 28 may be either of the direct current type or the unidirectional current type.

In general, the electrical control apparatus shown in FIG. 1 operates to control the energization of the motor 30. In the absence of a control signal or voltage applied at the control terminals 26 and 28, the resistance between the emitter 42 and the collector 44 of the transistor 40 is relatively high. Since the effective resistance across the secondary winding 24 of the reactor 20 is high, the corresponding impedance or resistance across the primary winding 22 of the reactor 20 is also high. The reactor 20 then operates similarly to a transformer operating under no load conditions, and permits only a very low magnetizing current to flow in the series circuit which includes the primary winding 22 of the reactor 20 and the motor 30. The latter current is not sufficient to start the motor 30.

On the other hand, when a unidirectional current control signal or voltage is applied at the control terminals 26 and 28, having a polarity which is positive at the terminal 26 with respect to the voltage at the terminal 28, the resistance between the emitter 42 and the collector 44 of the transistor 40 decreases to a negligible value. The secondary winding 24 of the reactor 20 is therefore substantially short-circuited and the effective impedance or resistance of the primary winding 22 will drop to a negligible value. When the impedance of the primary winding 22 decreases to a negligible value, the flow of current to the motor 30 increases and causes the motor to start. In other words, the motor 30 is started by the application of a unidirectional current control signal to the transistor 40 which changes the conduction state of the transistor 40 from a substantially cut-off or non-conducting condition to a saturation or "on" condition. If the conduction state of the transistor 40 is changed sufficiently quickly, the power handling capabilities of the transistor 40 can be greatly increased. Thus, the power handling capabilities of the transistor 40 need only be a fraction of the power rating of the motor 30. A rapid change in the conduction state of the transistor 40 can be obtained for example, by means of a conventional contact or triggering circuit (not shown) connected at the control terminals 26 and 28.

Figure 2:
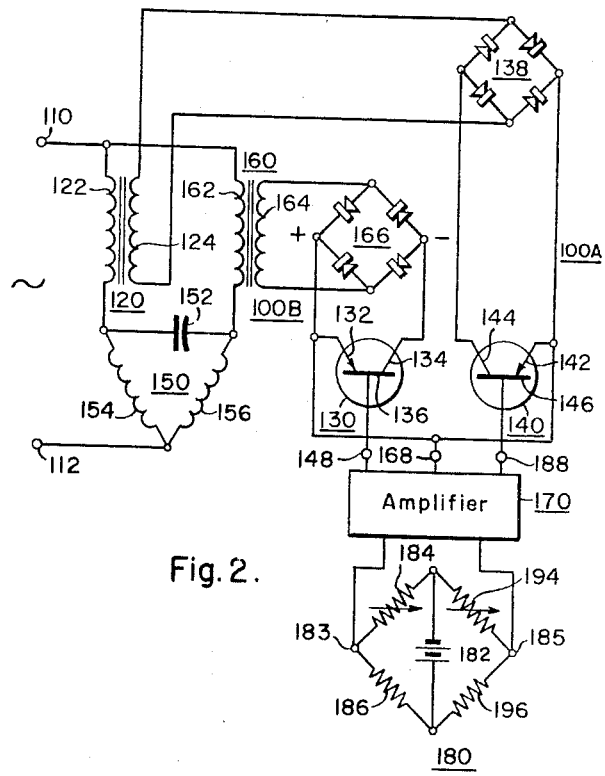
FIG. 2 is a schematic diagram of circuits and apparatus illustrating a second embodiment of this invention.

Referring now to FIG. 2, there is illustrated an electrical control apparatus similar to the control apparatus shown in FIG. 1, except that the control apparatus shown in FIG. 2 is adapted to control the direction of rotation of a reversible electric motor 150. The motor 150 is of any conventional type and includes a first winding 154 associated with one direction of rotation, a second winding 156 associated with the opposite direction of rotation and a capacitor 152 connected between one or both of said windings in order to obtain a difference in phase with respect to the voltages applied to said first and second windings. Electric power is supplied to the motor 150 from a source of alternating current (not shown) connected at the supply terminals 110 and 112. One end of each of the first and second windings 154 and 156, respectively, is connected to the supply terminal 112. The other end of the first winding 154 is connected to the supply terminal 110 through the primary winding 122 of the reactor 120. The other end of the second winding 156 of the motor 150 is connected to the supply terminal 110 through the primary winding 162 of the reactor 160. The reactors or transformers 120 and 160 include the second or secondary windings 124 and 164, respectively.

In order to control the flow of electric current power through the primary windings 122 and 162 of the reactors 120 and 160, respectively, the variable impedance or resistance means 100A and 100B, respectively, are provided. The variable resistance means 100A includes a full-wave rectifier 138 and the transistor 140, having a base 146, an emitter 142 and a collector 144. The input terminals of the rectifying means 138 are connected across the secondary winding 124 of the reactor 120. The output terminals of the rectifier 138 are connected to the collector 144 and the emitter 142 of the transistor 140. The base 146 and the emitter 142 of the transistor 140 are connected to the control terminals 188 and 168, respectively.

Similarly, the variable resistance means 100B includes the full-wave rectifier 166 and the transistor 130 having a base 136, an emitter 132 and a collector 134. The input terminals of the rectifier 166 are connected across the secondary winding 164 of the reactor 160. The output terminals of the rectifier 166 are connected to the emitter 132 and to the collector 134 of the transistor 130. The emitter 132 and the base 136 of the transistor 130 are connected to the control terminals 168 and 148 respectively.

The control terminals 148, 168 and 188 are connected to the output of a conventional push-pull amplifier 170. It is obvious that the amplifier 170 may be provided in the form of two separate conventional amplifiers in a particular application. In order to control the conduction state of the transistors 130 and 140, a bridge circuit 180 is provided for applying a unidirectional current or direct current control signal or voltage to the control terminals 148, 168 and 188 through the amplifier 170.

In particular, the bridge circuit 180 includes a first parallel branch comprising the resistors 184 and 186 connected in series circuit relationship and a second parallel branch comprising the resistors 194 and 196 connected in series circuit relationship. A source of direct current, illustrated as a battery 182, is connected between the common terminal which joins the resistors 184 and 194 and the common terminal which joins the resistors 186 and 196. The output terminals 183 and 185 of the bridge circuit 180 are connected to the input of the amplifier 170.

In operation, the bridge circuit 180 provides a unidirectional current control voltage or signal at the output terminals 183 and 185 of such polarity as to cause a control signal at the control terminals 148, 168 and 188, which in turn causes one of the transistors 130 or 140 to be conducting. The variable resistor 184 is adjusted initially and then left at a fixed value in order to obtain a desired control signal at the output terminals 183 and 185 of the bridge circuit 180. The polarity of the output signal at the terminals 183 and 185 is then controlled by adjustment of the variable resistor 194.

Considering the overall operation of the electrical control apparatus shown in FIG. 2, it will be assumed that the variable resistor 194 of the bridge circuit 180 is adjusted initially to provide a unidirectional current control signal or voltage through the amplifier 170 to the control terminals 148, 168, and 188 which is positive at the terminal 148 with respect to the terminal 168 and negative at the terminal 188 with respect to the terminal 168. The transistor 130 is then substantially non-conducting or cut-off since the emitter 132 is negative with respect to the base 136 of the transistor 130. The resistance between the emitter 132 and the collector 134 of the transistor 130 is then at a high value and the corresponding impedance of the primary winding 162 of the associated reactor 160 is also high with the second winding 156 of the motor 150 substantially deenergized. On the other hand, the transistor 140 will be substantially turned "on" or conducting saturation current since the emitter 142 is positive with respect to the base 146 of the transistor 140. The resistance in the emitter-collector path of the transistor 140 is therefore at a very low value and the corresponding impedance of the primary winding 122 of the associated reactor 120 is at a very low value. The first winding 154 of the motor 150 is therefore energized from the source (not shown) connected at the supply terminals 110 and 112 through the primary winding 122 of the reactor 120 to cause the motor 150 to operate in a first predetermined direction.

On the other hand, if it is assumed that the variable resistor 194 is adjusted to reverse the polarity of the unidirectional current control voltage at the control terminals 148, 168 and 188 applied through the amplifier 170, the control terminal 148 is now negative with respect to the control terminal 168 and the control terminal 188 is positive with respect to the control terminal 168. The conduction states of the transistors 130 and 140 are now reversed, with the transistor 130 conducting saturation current and the transistor 140 substantially cut-off or non-conducting, in accordance with the change in polarity of the control voltage applied at the control terminals 148, 168 and 188. Therefore, the resistance between the emitter 142 and the collector 144 of the transistor 140 is relatively high and the effective impedance in the primary winding 122 of the associated reactor is also high to thereby deenergize the first winding 154 of the motor 150. One the other hand the resistance between the emitter 132 and the collector 134 of the transistor 130 is very low and the effective impedance of the primary winding 162 of the reactor 160 is also very low to thereby energize the winding 156 of the motor 150 and reverse the direction of rotation of the motor 150 with respect to the direction of rotation previously described.

In summary, the electrical control apparatus shown in FIG. 2 operates to energize either the first winding 154 or the second winding 156 of the motor 150, depending on the polarity of the control voltage or signal at the output terminals 183 and 185 of the bridge circuit 180. Depending upon the polarity of the control voltage at the terminals 183 and 185, which is applied to the control terminals 148, 168 and 188 through the amplifier 170, either the transistor 130 or the transistor 140 will be turned "on" or become conducting to thereby reduce the resistance in the emitter-collector path of the transistor which is turned on. The other transistor will be held in a substantially cut-off condition because of the polarity of the control voltage. When the resistance between the emitter and the collector of the transistor 130 or the transistor 140 decreases to a low or negligible value, the effective impedance of the primary winding of the associated reactors 160 and 120, respectively, also decreases to a low or negligible value thus permitting the flow of increased current to the first winding 154 or to the second winding 156 of the motor 150. When the polarity of the terminals 183 and 185 is reversed by an adjustment of the variable resistor 194, the conduction states of the transistors 130 and 140 are reversed and the impedance of the primary winding of the reactor associated with the conducting transistor will decrease to a low or negligible value and energize the other winding of the motor 150.

Figure 3:
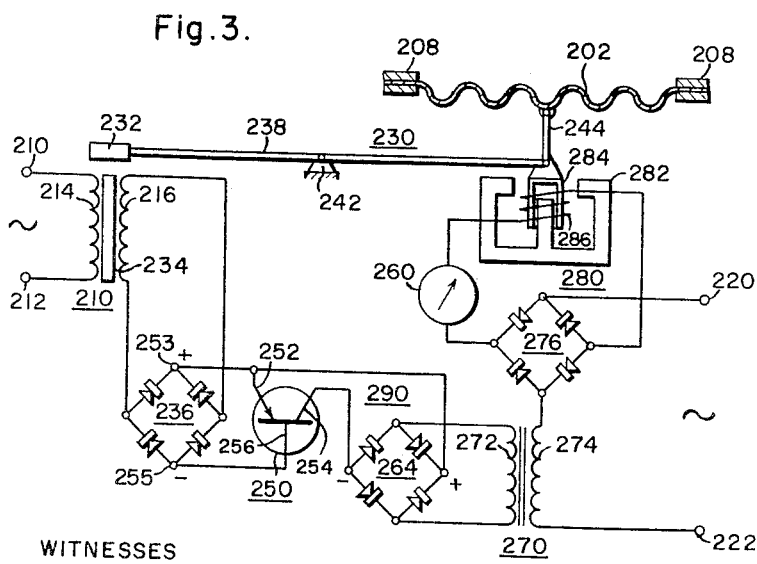
FIG. 3 is a schematic diagram of circuits and apparatus illustrating a third embodiment of the invention which may be used in pressure measuring apparatus.

Referring now to FIG. 3, there is illustrated a pressure or pressure differential measuring apparatus incorporating the teachings of this invention. In general, means are provided for obtaining a control signal or voltage which varies with the pressure applied to a flexible member. The control signal is then applied to a transistor to control the impedance of the primary winding of an associated reactor which in turn controls the current through an indicating means.

In order to obtain a control signal which varies with changes in pressure, there is provided a flexible member of diaphragm 202, disposed to deform with changes in the pressure applied to said flexible member, an inductive device 210, whose output voltage varies with the coupling between its windings, and a mechanical linkage 230 which is connected between said flexible member 202 and said inductive device 210 to vary the coupling between the windings of the inductive device 210 in accordance with changes in the pressure applied to the flexible member 202. In particular, the flexible member 202, as illustrated, is supported by the fixed supporting members 208. The mechanical linkage 230 includes a bar 244 which is connected to the flexible member 202, a lever arm 238 which is pivotally connected to the bar 244 and a fixed pivot member 242 which supports the lever arm 238. The inductive device 210 includes a first winding 214, a second winding 216, a magnetic core 234 and an armature 232 which is attached to the lever arm 238 of the mechanical linkage 230. The first winding 214 of the inductive device 210 is connected to a source of alternating current (not shown) connected at the terminals 210 and 212.

In the operation of the inductive device 210, the output voltage or control signal across the second winding 216 varies with the coupling between the first winding 214 and the second winding 216 which depends on the deflection or movement of the armature 232. The movement of the armature 242, in turn, depends upon the rotation of the lever arm 238 which is caused by deformation of the flexible member 202, which is transmitted to the lever arm 238 by the bar 244. Since the deformation of the flexible member 202 varies with the changes in the pressure applied to the flexible member 202, movement of the armature 232 of the inductive device 210 is controlled by changes in the pressure applied to the flexible member 202. The alternating output control voltage across the second winding 216 of the inductive device 210 therefore varies with the pressure applied to the flexible member 202. In order to convert the control signal or voltage across the winding 216 to a unidirectional current or direct current control signal, the second winding 216 of the inductive device 210 is connected to the input terminals of a full-wave rectifier 236. The unidirectional current control signal from the inductive device 210 therefore appears at the output terminals 253 and 255 of the full-wave rectifier 236.

The unidirectional current control signal at the terminals 253 and 255 is then applied to a variable resistance or impedance means 290 to control the effective impedance of the primary winding 274 of the reactor 270. The variable resistance or impedance means 290 includes the transistor 250, having a base 256, an emitter 252 and a collector 254, and a full-wave rectifying means 264. In order to vary the resistance in the emitter-collector path of the transistor 250, the emitter 252 and the base 256 are connected to the output terminals 253 and 255, respectively, of the full-wave rectifier 236. In turn, the emitter 252 and the collector 254 of the transistor 250 are connected to the input terminals of the full-wave rectifier 264. The output terminals of the rectifier 264 are connected across the secondary winding 272 of the reactor 270.

In the operation of the variable resistance means 290, the resistance between the emitter 252 and the collector 254 of the transistor 250 varies with the control signal applied at the terminals 253 and 255, which is positive at the terminal 253 with respect to the terminal 255. Therefore, the resistance across the secondary winding 272 of the reactor 270 also varies with the control signal at the terminals 253 and 255 and the corresponding impedance of the primary winding 274 of the reactor or transformer 270 also varies with the control signal at the terminals 253 and 255. Since the control signal at the terminals 253 and 255 varies with the pressure applied to the flexible member 202, the impedance of the primary winding 274 of the reactor 270 varies in turn with the pressure applied to the flexible member 202.

In order to indicate the changes in the impedance of the primary winding 274 of the reactor 270, and the corresponding changes in the pressure applied to the flexible member 202, the primary winding 274 of the reactor 270 is connected in series circuit relation with a full-wave rectifier 276, the series circuit being connected to a source of alternating current (not shown) connected at the terminals 220 and 222. An indicating means 260 is connected across the output terminals of the full-wave rectifier 276 in series with the winding 286 of the electromagnetic device 280, the purpose of which will be explained hereinafter. The current through the indicating means 260 varies with changes in the impedance of the primary winding 274 of the reactor 270 which in turn varies with the pressure applied to the flexible member 202. The indicating means 260 can therefore be calibrated to indicate either pressure or a pressure differential with respect to the pressure applied to the flexible member 202.

In order to restore the mechanical linkage 230 to substantially its original or neutral position following a change in the pressure applied to the flexible member 202, an electromagnetic device or means 280 is provided to exert a force on the mechanical linkage 230 which is substantially equal and opposite to the force exerted on the mechanical linkage 230 by the pressure applied to the flexible member 202. In particular, the electromagnetic device as illustrated includes a magnetic core structure 282, an armature 284 which is attached to the bar 244 of the mechanical linkage 230 and a coil or winding 286 which is disposed on the armature 284. The winding 286 of the electromagnetic device 280 is connected in series with the indicating or detecting means 260 and the current therethrough varies with the current through the indicating or detecting means 260.

In the operation of the electromagnetic device 280, the winding 286 has a low resistance and the current therethrough produces a strong magnetic field which cooperates with the magnetic core 282 and causes the armature 284 to exert a force on the mechanical linkage 230. The latter force is opposite to the force exerted on the mechanical linkage 230 by the pressure applied to the flexible member 202. The force exerted by the electromagnetic device 280 on the mechanical linkage 230 varies with the current in the winding 286, which in turn varies with the current in the indicating means 260 and the pressure applied to the flexible member 202. Therefore, the restoring force exerted on the mechanical linkage 230 by the electromagnetic means 280 varies with the pressure applied to the flexible member 202.

Considering the overall operation of the pressure measuring apparatus shown in FIG. 3, a change in the pressure applied to the flexible member 202 produces a deflection or movement of the armature 232 of the inductive device 210. A movement of the armature 232 changes the coupling between the first winding 214 and the second winding 216 of the inductive device 210 and changes the output voltage or control signal across the winding 216. A change in the control signal across the winding 216 causes a corresponding change in the control voltage applied between the emitter 252 and the base 256 of the transistor 250 through the rectifier 236. A change in the control voltage applied between the base 256 and the emitter 252 of the transistor 250 causes a change in the resistance between the emitter 252 and the collector 254 of the transistor 250 which in turn causes a change in the resistance across the secondary winding 272 and the impedance of the primary winding 274 of the reactor 270. A change in the impedance of the primary winding 274 of the reactor 270 causes a change in the current flow through the indicating means 260 and also changes the current in the coil or winding 286 of the electromagnetic device 280 which tends to restore the mechanical linkage to its original position prior to the change in the pressure applied to the flexible member 202.

It should be noted that the ratio of transformation between the secondary winding 272 and the primary winding 274 of the reactor or transformer 270 can be selected in a particular application to match the impedances of the low resistance winding 286 of the electromagnetic device 280, and the higher effective resistance of the variable resistance means 290. It should also be noted that the full-wave rectifiers 236 and 264 are provided in order to insure that the voltages or currents applied to the transistor 250 are of the unidirectional current or direct current type.

It is to be understood that an electrical control apparatus incorporating the teachings of this invention can be provided for three-phase circuits rather than in a single phase circuit as indicated in the various embodiments of this invention. In addition, it is clear that other types of semiconductor devices such as N-P-N junction transistors can be employed in an electrical control apparatus of the type disclosed with suitable changes in the connections of the semiconductor devices. It will be appreciated that measuring apparatus of the type shown in FIG. 3 may be provided for measuring quantities other than pressure, such as temperature.

The apparatus embodying the teachings of this invention has several advantages. For example, an electrical control apparatus incorporating the teachings of this invention is completely static and thus requires a minimum of maintenance. In addition, a single transistor and a reactor may be employed to control the flow of electric power from a source of alternating current to a load. By the use of a reactor or transformer, the required voltage rating of the transistor is reduced and by the application of a suitable control signal, the transition time between the conduction states of the transistor may be reduced to thereby increase the amount of power which may be controlled by the transistor to a value which is much larger than the continuous power rating of the transistor.

Since numerous changes may be made in the above described apparatus and circuits and different embodiments of the invention may be made without departing from the spirit thereof, it is intended that all the matter contained in the foregoing description or shown in the accompanying drawing shall be interpreted as illustrative and not in a limiting sense.

I claim as my invention:

1. In an electrical control apparatus for controlling the direction of rotation of a motor having first and second windings, in combination, a source of alternating current having one terminal connected to one end of each of said first and second windings and a second terminal, first and second transformers each having primary and secondary windings, the primary windings of said first and second transformers being connected between said first and second windings of said motor and said second terminal of said source, first and second transistors each having a base, an emitter and a collector, the emitter-collector paths of said first and second transistors being connected across the secondary windings of said first and second transformers respectively, first and second rectifying means connected between the secondary windings of said first and second transformers and said first and second transistors for rectifying the voltage applied between the emitter and the collectors of each of said transistors, and means for applying a control voltage between the emitter and the base of each of said transistors of such polarity to reduce the resistance in the emitter-collector path of one of said transistors and the corresponding resistance in the primary winding of the associated transformer and to energize the winding of said motor connected to the associated transformer.

2. In an electrical control apparatus for controlling the direction of rotation of a motor having first and second windings, in combination, a source of alternating current having a first terminal and a second terminal, said first terminal being connected to one end of each of said first and second windings, first and second reactors associated with said first and second windings, each having primary and secondary windings, the primary windings of said first and second reactors being connected between the first and second windings respectively of said motor and the second terminal of said source, and variable impedance means connected across the secondary windings of each of said first and second reactors for controlling the impedances of the primary windings of said first and second reactors and the flow of current from said source to the first and second windings of said motor, said impedance means comprising first and second transistors each having a base, an emitter and a collector, rectifying means connected between the secondary windings of said first and second reactors and the emitter-collector paths of said first and second transistors, respectively, control terminals connected between the base and the emitter of each of said first and second transistors, and means for applying a control signal of such polarity to reduce the resistance in the emitter-collector path of one of said transistors and the corresponding impedance in the primary winding of the associated reactor to energize the winding of said motor connected to said reactor.

3. In an electrical control apparatus for controlling the direction of rotation of a motor having first and second windings, in combination, a source of alternating current having a first terminal and a second terminal, said first terminal being connected to one end of each of said first and second windings, first and second transformers each having a primary winding and a secondary winding, the primary windings of said first and second transformers being connected between the first and second windings repsecitvely of said motor and the second terminal of said source, first and second transistors each having a base, an emitter and a collector, first and second full-wave rectifying means connected between the secondary windings of said first and second transformers respectively and said first and second transistors respectively for applying a unidirectional voltage between the emitter and the base of said first and second transistors, and means for applying a control voltage to one of said transistors of such polarity to reduce the resistance between the emitter and the collector of one of said transistors and the corresponding impedance in the primary winding of the associated transformer to thereby energize the winding of said motor connected to the associated transformer.

4. In an electrical control apparatus for controlling the direction of rotation of a motor having first and second windings, in combination, a source of alternating current having one terminal connected to one end of each of said first and second windings and a second terminal, first and second transformers each having primary and secondary windings, the primary windings of said first and second transformers being connected between said first and second windings of said motor and said second terminal of said source, first and second transistors each having a base, an emitter and a collector, the emitter-collector paths of said first and second transistors being connected across the secondary windings of said first and second transformers respectively, first and second rectifying means connected between the secondary windings of said first and second transformers and said first and second transistors for rectifying the voltage applied between the emitter and the collectors of each of said transistors, and means for applying a control voltage between the emitter and the base of each of said transistors of such polarity to reduce the resistance in the emitter-collector path of one of said transistors and the corresponding resistance in the primary winding of the associated transformer and to energize the winding of said motor connected to the associated transformer, the last-mentioned means including a resistive bridge circuit and a source of unidirectional current voltage connected in circuit relation with said bridge circuit.

5. In an electrical control apparatus for controlling the direction of rotation of a motor having first and second windings, in combination, a source of alternating current having a first terminal and a second terminal, said first terminal being connected to one end of said first and second windings, first and second reactors associated with said first and second windings, each having primary and secondary windings, the primary windings of said first and second reactors being connected between the first and second windings respectively of said motor and the second terminal of said source, and variable impedance means connected across the secondary windings of each of said first and second reactors for controlling the impedances of the primary windings of said first and second reactors and the flow of current from said source to the first and second windings of said motor, said impedance means comprising first and second transistors each having a base, an emitter and a collector, reactifying means connected between the secondary windings of said first and second reactors and the emitter-collector paths of said first and second transistors, respectively, control terminals connected between the base and the emitter of each of said first and second transistors, and means for applying a control signal of such polarity to reduce the resistance in the emitter-collector path of one of said transistors and the corresponding impedance in the primary winding of the associated reactor to energize the winding of said motor connected to said reactor, the last-mentioned means including a resistive bridge circuit and a source of unidirectional current voltage connected in circuit relation with said bridge circuit.

6. In an electrical control apparatus for controlling the direction of rotation of a motor having first and second windings, in combination, a source of alternating current having a first terminal and a second terminal, said first terminal being connected to one end of each of said first and second windings, first and second transformers each having a primary winding and a secondary winding, the primary windings of said first and second transformers being connected between the first and second windings respectively of said motor and the second terminal of said source, first and second transistors each having a base, an emitter and a collector, first and second full-wave rectifying means connected between the secondary windings of said first and second transformers respectively and said first and second transistors respectively for applying a unidirectional voltage between the emitter and the base of said first and second transistors, and means for applying a control voltage to one of said transistors of such polarity to reduce the resistance between the emitter and the collector of one of said transistors and the corresponding impedance in the primary winding of the associated transformer to thereby energize the winding of said motor connected to the associated transformer, the last-mentioned means including a resistive bridge circuit and a source of unidirectional current voltage connected in circuit relation with said bridge circuit.

References Cited in the file of this patent

UNITED STATES PATENTS 2,767,364     Guggi ------------------ Oct. 16, 1956